United States Patent
Takeuchi et al.

(10) Patent No.: US 8,589,764 B2
(45) Date of Patent: Nov. 19, 2013

(54) DATA STORAGE DEVICE AND CONTROL DEVICE CONFIGURED TO CONTROL DATA TRANSFER BETWEEN A HOST DEVICE, A FIRST STORAGE, AND A SECOND STORAGE

(75) Inventors: Ken Takeuchi, Tokyo (JP); Mayumi Fukuda, Tokyo (JP); Kazuhide Higuchi, Tokyo (JP)

(73) Assignee: The University of Tokyo, Tokyo (JP)

( * ) Notice: Subject to any disclaimer, the term of this patent is extended or adjusted under 35 U.S.C. 154(b) by 236 days.

(21) Appl. No.: 13/228,179

(22) Filed: Sep. 8, 2011

(65) Prior Publication Data
US 2012/0089877 A1 Apr. 12, 2012

(30) Foreign Application Priority Data
Sep. 14, 2010 (JP) .................................. 2010-205965

(51) Int. Cl.
*H03M 13/00* (2006.01)

(52) U.S. Cl.
USPC .................. 714/763; 365/185.09; 365/185.33

(58) Field of Classification Search
USPC .......................... 714/763; 365/185.09, 185.33
See application file for complete search history.

(56) References Cited

U.S. PATENT DOCUMENTS

| | | | |
|---|---|---|---|
| 7,912,991 B1 * | 3/2011 | Merry et al. ........................ | 710/8 |
| 7,920,432 B2 * | 4/2011 | Lee et al. .................. | 365/189.15 |
| 8,078,923 B2 * | 12/2011 | Nagadomi et al. ............ | 714/706 |
| 8,149,625 B2 * | 4/2012 | Hwang ..................... | 365/185.19 |
| 8,296,498 B2 * | 10/2012 | Gorobets et al. ............... | 711/103 |
| 8,321,597 B2 * | 11/2012 | Yu et al. ............................ | 710/5 |
| 8,427,870 B2 * | 4/2013 | Kim et al. ................ | 365/185.09 |
| 8,443,144 B2 * | 5/2013 | Yim et al. ...................... | 711/118 |

OTHER PUBLICATIONS

Takashima et al.; "A 128Mb ChainFeRAM™ and System Designs for HDD Application and Enhanced HDD Performance," *IEEE Asian Solid-State Circuits Conference*; Nov. 16-18, 2009; pp. 13-16; Taipei, Taiwan.

* cited by examiner

*Primary Examiner* — Esaw Abraham
(74) *Attorney, Agent, or Firm* — Oliff & Berridge, PLC (57) ABSTRACT

When write request signal is input from a host device, an SSD inputs data input from the host device in an encoder sequentially and controls a RRAM to store data output from the encoder. When size of data stored in the RRAM reaches predetermined size Sref, the SSD controls the RRAM to read out data of size of the predetermined size Sref, inputs read data from the RRAM in the encoder, and controls a flash memory to store data output from the encoder. This configuration accomplishes the increase of the data write speed and improvement of reliability of the data.

7 Claims, 4 Drawing Sheets

DATA STORAGE DEVICE AND CONTROL DEVICE CONFIGURED TO CONTROL DATA TRANSFER BETWEEN A HOST DEVICE, A FIRST STORAGE, AND A SECOND STORAGE

BACKGROUND OF THE INVENTION

1. Field of the Invention

The present invention relates to a control device and a data storage device.

2. Description of the Prior Art

One proposed structure of a control device controls a FeRAM (Ferroelectric Random Access Memory) as a cache memory or HDD to store data from a PC system (see, for example, Non-Patent Document 1). In the structure, the FeRAM is configured as a nonvolatile random access memory maintaining data stored therein when a power supply is stopped. In this device, data in the FeRAM is not regularly needed to be evacuated to HDD in preparation to an unexpected stop power supply. This arrangement enables to increase amount of data stored to FeRAM, and to increase cache hit ratio.

Non-patent document 1: Daisaburo Takahashi et al. "A 128 Mb ChainFeRAM™ and System Designs for HDD Application and Enhanced HDD Performance", IEEE Asian Solid-State Circuits Conference, Nov. 16-18, 2009, Taipei, Taiwan.

In the device described above, data is input from PC system relatively fast, and a write speed in writing the input data to the HDD is relatively low. When data is input from the PC system, acceptance of input of data from PC system is stopped at once. After the input data is written to the HDD, the acceptance of input of next data is restarted. In this case, a write speed in writing the input data from the PC system to the HDD is limited by a writing speed of the HDD. So it is desirable to have a large increase in data write speed. In general, the more the number of write operation in a nonvolatile memory, for example FeRAM etc., is, the increase of deteriorate tends to be. The decrease of the number of write operation and suppression of deterioration in the nonvolatile memory is desired.

SUMMARY OF THE INVENTION

In a control device and a data storage device, there would thus be demand for increasing a data write speed and suppression of deterioration of storage configured as a nonvolatile random access memory.

The present invention accomplishes at least part of the demand mentioned above and the other relevant demands by the following configurations applied to the control device and the data storage device.

According to one aspect, the present invention is directed to a control device configured to control data transfer between a host device, a first storage configured as a nonvolatile storage for storing data, and a second storage configured as a nonvolatile random access memory having faster write speed than the first storage. The control device includes: a data write processing unit configured to control the second storage to store data input from the host device sequentially when a write request signal requesting to write data stored in the host device to the first storage, and to control the second storage to read out predetermined size of data and control the first storage to store the read out data when the write request signal is input and size of data stored in the second storage reaches the predetermined size; and a data read out processing unit configured to control the first storage to read out data stored and to output the read out data to the host device without the second storage when a read out request signal requesting to read out data stored in the first storage to the host device.

In the control device according to this aspect of the invention, the control device controls the second storage to store data input from the host device sequentially when a write request signal requesting to write data stored in the host device to the first storage. The control device controls the second storage to read out predetermined size of data and controls the first storage to store the read out data when the write request signal is input and size of data stored in the second storage reaches the predetermined size. The control device is input data from the host device sequentially until the size of data stored in the second storage reaches the predetermined size. Thus reduction of the time required for stopping inputting data from the host device is accomplished, and increasing the data write speed is accomplished. The control device controls the first storage to read out data stored and outputs the read out data to the host device without the second storage when a read out request signal requesting to read out data stored in the first storage to the host device. This configuration decreases number of data writes operation to the second device compared to such a device that stores data read out from the first storage in the second storage and outputs stored data to the host device even when the read out request signal is input. Thus suppression of deterioration of the second storage is accomplished. Increasing the data write speed is accomplished, and the suppression of deterioration of the second storage is accomplished. BCH code, block code or convolutional code is allowed to be used as the predetermined error correcting code.

In the control device according to this aspect of the invention, a first encoding circuit configured to encode input data into a predetermined error correcting code and to output the encoded data; and a decoding circuit configured to perform error correction and decoding on input data as the predetermined error correcting code and to output decoded data; wherein the data write processing unit inputs data input from the host device to the first encoding circuit and controls the second storage to store data output from the first encoding circuit sequentially when the write request signal is input; and the data read out processing unit inputs read out data from the first storage in the decoding circuit and outputs data output from the decoding circuit to the host device when the read out request signal is input. This configuration is capable of performing error correction on data stored in the first storage and the second storage when the stored data occurs error for some reasons. Thus improvement of reliability of the data is accomplished.

In the control device according to this aspect of the invention and including the first encoding circuit and the decoding circuit, a second encoding circuit is configured to encode input data into the predetermined error correcting code and to output the encoded data. In the control device, the data write processing unit controls the second storage to read out the predetermined size of data, inputs the read out data in the decoding circuit, inputs data output from the decoding circuit in the second encoding circuit, and controls the first storage to store data output from the second encoding circuit when the write request signal is input and size of data stored in the second storage reaches the predetermined size. Thus the higher reliability of data is accomplished. In the control device, a circuit for decoding data output from the first storage in writing data is capable of being used as a circuit for decoding data output from the second storage in writing data. Thus suppression of increase in area of circuit is accomplished.

In the control device according to this aspect of the invention and including the first encoding circuit, the second encoding circuit and the decoding circuit, the first storage has n semiconductor chips (the n is integer and equal to or larger than 1) and is capable of parallel data read/write to the n semiconductor chips, the semiconductor chip having a nonvolatile memory that differs in type from a nonvolatile memory configuring the second storage. The second storage has m semiconductor chips (the m is integer and equal to or larger than 1) and is capable of parallel data read/write to the m semiconductor chips, the semiconductor chip having a nonvolatile random access memory as the nonvolatile memory. The first encoding circuit is capable of encoding input data into m predetermined error correcting codes being l (l is integer and equal to or larger than 1) in a code length and outputting the encoded data, the code length being length of data in encoding input data. The second encoding circuit encodes input data into n predetermined error correcting codes being k (k satisfies a formula 1, is integer, and is equal to or larger than 1) in the code length and outputting the encoded data. The decoding circuit performs error correction and decoding on input data as the n predetermined error correcting codes being the k in the code length and outputs the decoded data when data is input from the first storage, and performs error correction and decoding on input data as the m predetermined error correcting codes being the l in the code length and outputs the decoded data when data is input from the second storage. The data write processing unit inputs data input from the host device to the first encoding circuit and controls the second storage to store data output from the first encoding circuit in each semiconductor chips of the second storage when the write request signal is input, and controls the second storage to read out data in parallel from each semiconductor chips of the second storage, inputs the read out data in the decoding circuit, inputs data output from the decoding circuit in the second encoding circuit, and controls the second storage to store n data output from the second encoding circuit when the write request signal is input and size of data stored in the second storage reaches the predetermined size. The data read out processing unit controls the first storage to read out data in parallel from each semiconductor chips of the first storage, inputs read out n data from the first storage in the decoding circuit and outputs data output from the decoding circuit to the host device when the read out request signal is input. The formula 1 is "m·l=n·k".

According to the first aspect, the present invention is directed to a data storage device configured to store data. The data storage device includes: a control device configured to control data transfer between a host device, a first storage configured as a nonvolatile storage for storing data, and a second storage configured as a nonvolatile random access memory having faster write speed than the first storage, the control device having: a data write processing unit configured to control the second storage to store data input from the host device sequentially when a write request signal requesting to write data stored in the host device to the first storage, and to control the second storage to read out predetermined size of data and control the first storage to store the read out data when the write request signal is input and size of data stored in the second storage reaches the predetermined size; and a data read out processing unit configured to control the first storage to read out data stored and to output the read out data to the host device without the second storage when a read out request signal requesting to read out data stored in the first storage to the host device; a hard disk drive as the first storage; and any one of a resistance random access memory, a ferroelectric random access memory, a magnetoresistive random access memory, a phase change random access memory, or a flash memory as the second storage.

In the data storage according to the first aspect of the invention, the data storage has the control device according to the above aspect of the invention. The present invention accomplishes at any one part of the demand mentioned above by the following configuration applied to the control device, for example, the demand of increase of data write speed in writing data and the demand of the suppression of the deterioration of the second storage.

According to the second aspect, the present invention is directed to a data storage device is configured to store data. The data storage includes: a control device configured to control data transfer between a host device, a first storage configured as a nonvolatile storage for storing data, and a second storage configured as a nonvolatile random access memory having faster write speed than the first storage, the control device having: a data write processing unit configured to control the second storage to store data input from the host device sequentially when a write request signal requesting to write data stored in the host device to the first storage, and to control the second storage to read out predetermined size of data and control the first storage to store the read out data when the write request signal is input and size of data stored in the second storage reaches the predetermined size; and a data read out processing unit configured to control the first storage to read out data stored and to output the read out data to the host device without the second storage when a read out request signal requesting to read out data stored in the first storage to the host device; a flash memory as the first storage; and any one of a resistance random access memory, a ferroelectric random access memory, a magnetoresistive random access memory, a phase change random access memory, as the second storage.

In the data storage according to the second aspect of the invention, the data storage has the control device according to the above aspect of the invention. The present invention accomplishes at any one part of the demand mentioned above by the following configuration applied to the control device, for example, the demand of increase of data write speed in writing data and the demand of the suppression of the deterioration of the second storage.

DESCRIPTION OF THE PREFERRED EMBODIMENTS

One mode of carrying out the invention is described below as a preferred embodiment.

Figure 1:
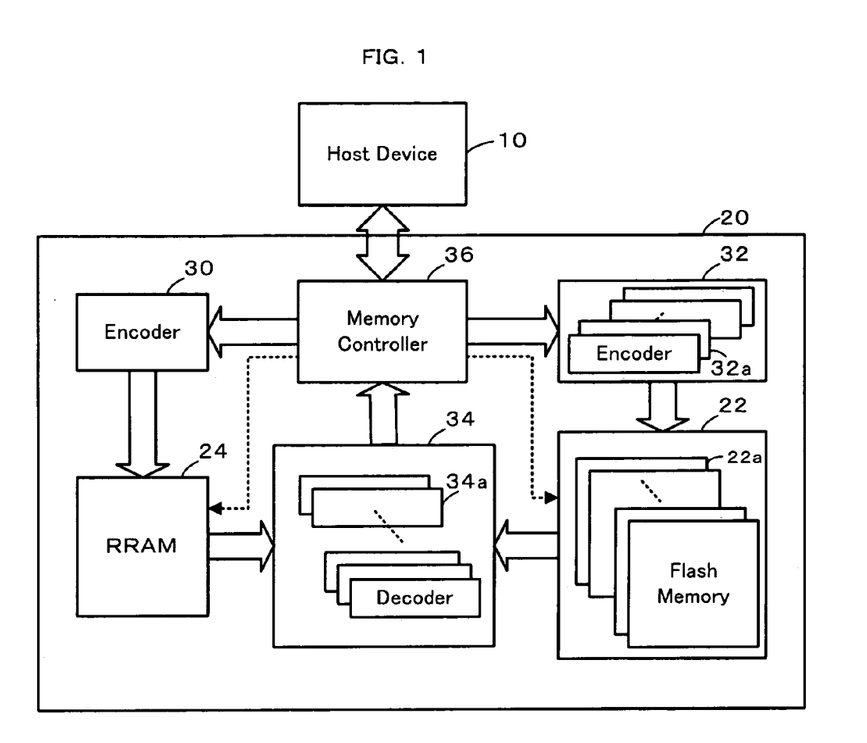
FIG. 1 schematically illustrates one configuration of a SSD (Solid State Drive) 20.

FIG. 1 schematically illustrates one configuration of a SSD (Solid State Drive) 20 storing data from a host device 10, for example, personal computer. The SSD 20 is configured as a large-capacity data storage storing application programs and data. The SSD 20 has a flash memory 22 configured as a NAND type flash memory, a RRAM 24 configured as a resistance random access memory, encoders 30 and 32 encoding input data into BCH code and outputting encoded data, a decoder 34 performing error correction and decoding on input data as BCH code, and a memory controller 36 configured to control the flash memory 22 and the RRAM 24 and to perform input/output operation of data to the host device 10, encoders 30 and 32 and decoder 34.

The flash memory 22 is configured to have 16 semiconductor chips 22a. The semiconductor chip 22 has a NAND type flash memory including a flash memory cell array (not illustrated) that has a plurality of flash memory cells that a threshold voltage varies by electrons injection into a floating gate or by drawing electrons away from the floating gate. In addition to the flash memory cell array, the semiconductor chip 22a has a Law decoder, a column decoder, a sense amplifier and so on (all not illustrated). In the flash memory 22, data is written or read out in a page. The stored data is erased in a block of a plurality of the pages. The flash memory 22 reads data in or writes data to 16 semiconductor chips 22a in parallel. In this embodiment, write speed in writing data to the flash memory 22 is set to be 160M bps (bit per second) per semiconductor chip 22a. Read out speed in read out data from the flash memory 22 is set to be 625M bps per semiconductor chip 22a. The write speed and the read out speed of whole flash memory 22 is set to be about 10 G bps respectively.

The RRAM 24 is configured to have a semiconductor chip (not illustrated) that includes an RRAM having a RRAM cell array (not illustrated) that has a plurality of RRAM cells. The RRAM cell has a resistance memory element 46 illustrated in FIG. 2, and a MOS transistor (not illustrated) connected with the resistance memory element 46. The resistance memory element 46 is configured to have a metal oxide 44 between a top electrode 40 formed by metal, for example, titanium (Ti) or platinum (Pt), and a bottom electrode 42 formed by metal, for example, titanium (Ti) or platinum (Pt). The RRAM 24 further has a Law decoder, a column decoder, a sense amplifier and so on (all not illustrated). The RRAM cell is configured as an element performing a bipolar operation. In the bipolar operation, the RRAM cell is set (lowered resistance) when voltage V1 applied in the top electrode 40 is higher than voltage V2 applied in the bottom electrode 42. The RRAM cell is reset (raised resistance) when the voltage V1 is lower than the voltage V2. In general, the RRAM cell performing such a bipolar operation is comparatively fast and low power element. The RRAM 24 is configured to be comparatively fast and low power element. It is considered that metal oxide, for example, titanium oxide (TiOx), nickel oxide (NiOx), copper oxide (CuOx), hafnium oxide (HfOx) or stricter by stacking a polarity of this metal oxide is preferred as the metal oxide 44. In the RRAM 24 configured above, the write speed in writing data to the RRAM 24 is faster than that of the flash memory 22. The read out speed in reading out data from RRAM 24 is faster than that of the flash memory 22. In this embodiment, the write speed and the read out speed are set to be 100 G bps.

The encoder 30 is configured to be a logic circuit having a plurality of logic element. The encoder 30 is configured to encode input data into BCH code having code length of 32 KB, and to output encoded data to the RRAM 24 sequentially.

The encoder 32 is configured to be a logic circuit having a plurality of logic element. The encoder 32 has 16 encoders 32a encoding input data into BCH code having code length of 2 KB. The encoder 32 outputs data encoded 16 BCH codes having code length of 2 KB to the semiconductor chips 22a of the flash memory 22 in parallel.

The decoder 34 is configured to be a logic circuit having a plurality of logic element. The decoder 34 has 16 small decoders 34a performing error correction and decoding on input data as BCH code having code length of 2 KB. The decoder 34 is configured to perform error correction and decoding on input data as BCH code having code length of 2 KB by the small decoders 34a when data is input in parallel from the semiconductor chip 22a of the flash memory 22. The decoder 34 is also configured to perform error correction and decoding on input data as BCH code having code length of 32 KB by the small decoders 34a when data is input from the RRAM 24.

The memory controller 36 is configured to be a logic circuit having a plurality of logic element. The memory controller 36 executes controls and arithmetic processes. The memory controller 36 is input control signals and data from the host device 10. The memory controller 36 controls the flash memory 22 and the RRAM 24 to store data based on the input control signal, controls the flash memory 22 and the RRAM 24 to read out data based on the input control signal, inputs data from the host device to the encoder 30, inputs data from the decoder 34 to the encoder 32, and outputs data from the decoder 34 to the host device 10. The memory controller 36 input/output control signals and data with the host device 10 at comparatively high speed (for example, about 10 G bps).

Next, the operation of the SSD 20 configured above, especially in storing data from the host device 10 in the flash memory 22 and in outputting data stored in the flash memory 22 to the host device 10, is explained. First, data writing operation storing data from the host device 10 in the flash memory 22 is described below.

Figure 3:
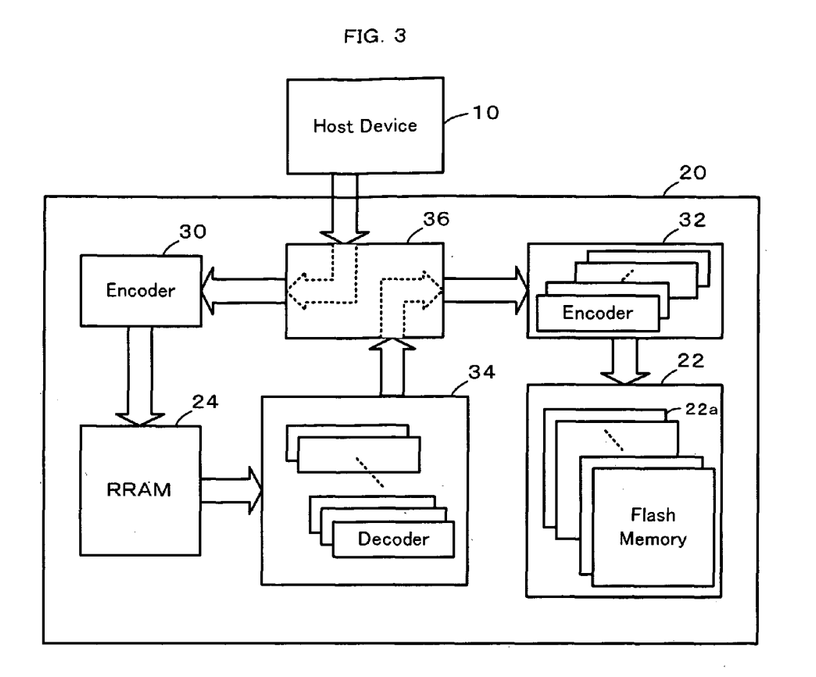
FIG. 3 schematically illustrates a data flow in data writing operation.

FIG. 3 schematically illustrates a data flow in the data writing operation. When the request write signal from the host device 10 is input in the memory controller 36, the memory controller 36 inputs data from the host device 10 to the encoder 30 sequentially. The encoder 30 that is input data encodes input data into BCH code having code length of 32 KB and outputs encoded data to the RRAM 24 sequentially. The memory controller 36 accepts input of data from the host device 10 until data from the RRAM 24 reaches preset predetermined size Sref, and controls RRAM 24 to store data from the encoder 30. In this embodiment, the predetermined size Sref is set to be data size corresponding to one page of flash memory or multiple of one page of flash memory in decoding data encoded by the encoder 30 and encoding decoded data to BCH code having code length of 2 KB by the encoder 32 as described below.

When data of predetermined size Sref is stored in the RRAM 24, the memory controller 36 stops input of data from the host device 10 and controls the RRAM 24 to output stored data to the decoder 34. When output of data to the decoder 34 is finished, the memory controller 36 starts to input data from the host device 10 again.

The decoder 34 that is input data performs error correction and decoding on input data as BCH code having code length of 32 KB, and outputs decoded data to the memory controller 36. Thus the decoder 34 performs error correction on data and outputs more corrected data to the memory controller 36 when the errors occurs in the data stored in the RRAM 24.

The memory controller 36 outputs data from the decoder 34 to the encoder 32. The encoder 32 that is input data encodes input data into 16 BCH codes having code length of 2 KB and outputs encoded data to 16 semiconductor chips 22a of the flash memory 22. The memory controller 36 controls the flash memory 22 embedded in the semiconductor chip 22 to store output data. Thus the data that is encoded on BCH code having code length of 2 KB is stored in the flash memory 22.

Under consideration that the write speed of the flash memory 22 (2.6 Gbps) is slower than that of the host device (10 Gbps), when data is written from the host device 10 to the flash memory 22 without the RRAM 24, the data input from the host device 10 is needed to be stopped from the time when data is input from the host device 10 to the time when the write operation in the flash memory 22 is finished. Thus time required to keep stopping data input from the host device 10 is considered to become comparatively long and the write speed is considered to become slow. In this embodiment, input data from the host device 10 is stored in the RRAM 24 that the write speed thereof (10 Gbps) is faster than that of the flash memory 22. When the size of data stored in the RRAM 24 reaches the predetermined size Sref, data input from the host device 10 is stopped and data stored in the RRAM 24 is output to the decoder 34. After that, processing for data from the host device 10 is started again executing processing in the decoder 34 and encoder 32. The readout speed of the RRAM 24 is 10 Gbps and comparatively fast. The time required to keep stopping data input from the host device 10 is comparatively short. This processing accomplishes to shorten the time required to keep stopping data input from the host device 10 and accomplishes increasing a data write speed.

Figure 4:
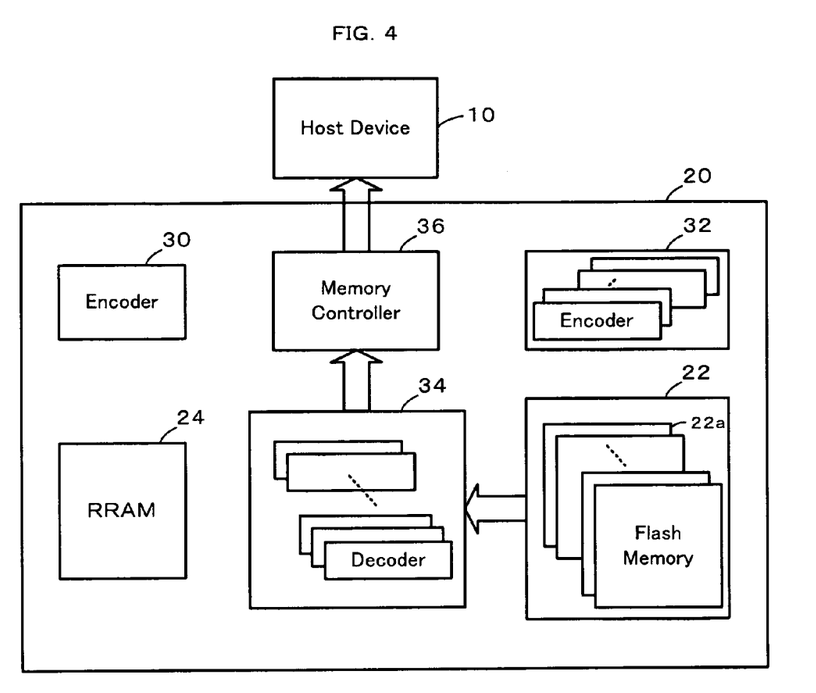
FIG. 4 schematically illustrates a data flow in data reading out operation.

Next, data reading out operation reading out data stored in the flash memory 22 to the host device 10 is described below. FIG. 4 schematically illustrates a data flow in the data reading out operation. When data read out request signal requesting to read out data stored in the flash memory 22 is input from the host device 10, the memory controller 36 controls the flash memory 22 to read out data stored in each semiconductor chip 22a of the flash memory 22 and input read out data in the small decoder 34a of the decoder 34.

The decoder 34 that is input data from the flash memory 22 performs error correction and decoding on input data as BCH code having the code length of 2 KB, and outputs decoded data to the memory controller 36. The memory controller 36 that is input data outputs input data to the host device 10. In this processing, when the error occurs in data stored in the flash memory 22, data performed error correction is outputted to the host device. Thus outputting more correct data to the host device 10 is accomplished, and improvement of reliability of the data is accomplished. Data stored in the flash memory 22 is read out to the host device 10 without the RRAM 24. Compared to the device read out data to the host device 10 with the RRAM 24, suppression of increase of the number of the write operation of the RRAM 24 is accomplished, and suppression of deterioration of the RRAM 24 is accomplished. Error correction and decoding on encoded data input from the flash memory 22 is performed by using the decoder 34 performing error correction and decoding on data from the RRAM 24 during data write operation. Compared to the device having another decoder, suppression of increase in area of circuit is accomplished.

In the SSD 20 of the embodiment, when the write request signal is input from the host device 10, the SSD 20 inputs data input from the host device 10 in the encoder 30 sequentially and controls the RRAM 24 to store data output from the encoder 30. When the size of data stored in the RRAM 24 reaches the predetermined size Sref, the SSD 20 controls the RRAM 24 to read out data of size of the predetermined size Sref, inputs read data from the RRAM 24 in the encoder 32, and controls the flash memory 22 to store data output from the encoder 32. This configuration accomplishes the increase of the data write speed and improvement of reliability of the data. When the data read out signal is input from the host device 10, the SSD 20 controls the flash memory 22 to read out data, inputs read out data in the decoder 34, and outputs data from the decoder 34 to the host device 10. This accomplishes improvement of reliability of the data output to the host device and the suppression of the deterioration of the RRAM 24. Thus suppression of increase in area of circuit is accomplished.

In the SSD 20 of the embodiment, the RRAM 24 is set to write and read 32 KB data, and the encoder 30 is set to encode data into the BCH code having code length of 32 KB. Specification of the encoder 30 is allowed to be changed based on size of data or number of data that the RRAM 24 is able to read out in parallel per read operation. For example, when the RRAM 24 is able to read or write 2 data having size of 16 KB in parallel, the encoder 30 is allowed to encode data into 2 BCH codes having code length of 16 KB. The flash memory 22 is set to write and read 16 data having size of 22 KB data in parallel, and the encoder 32 is set to encode data into 16 BCH codes having code length of 2 KB. Specification of the encoder 32 is allowed to be changed based on size of data or number of data that the flash memory 22 is able to read out in parallel per read operation. For example, when the flash memory 22 is able to read or write 4 data having size of 16 KB in parallel, the encoder 32 is allowed to encode data into 4 BCH codes having code length of 16 KB. The decoder is allowed to be such any type that is able to perform error correction and decoding on data encoded by the encoders 30 and 32.

In the SSD 20 of the embodiment, the encoders 30 and 32 are set to encodes input data into BCH code having code length different from each other, and the decoder 34 is set to perform error correction and decoding on data of BCH code having two different code length. The encoder 30 is allowed to encode input data into BCH code having same code length (for example, 2 KB) as the encoder 32, and the decoder 34 is set to perform error correction and decoding on BCH code having one code length (for example, 2 KB).

Figure 5:
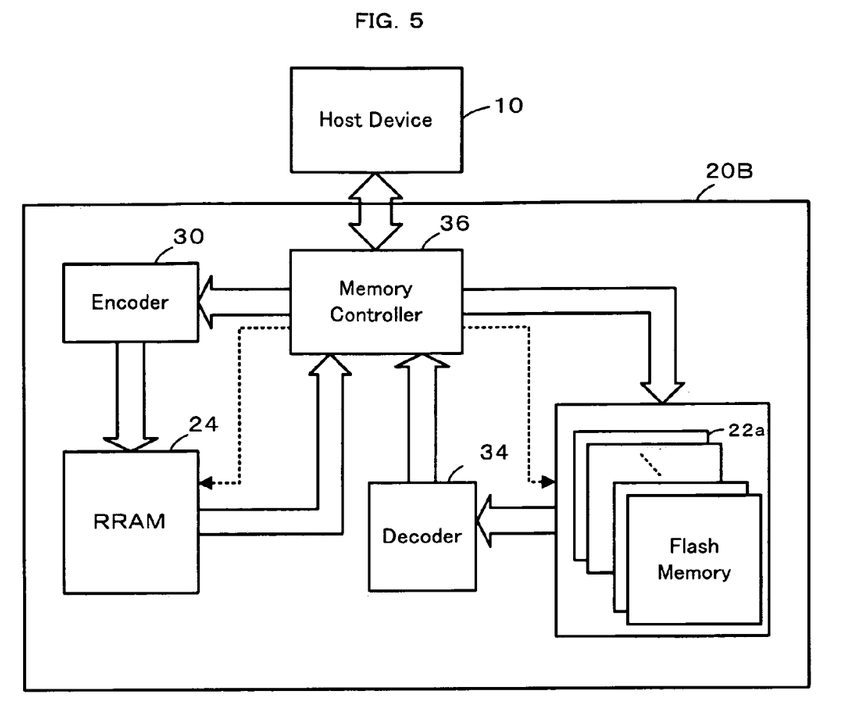
FIG. 5 schematically illustrates one configuration of another SSD 20B.

In the SSD 20 of the embodiment, the SSD 20 is set to have the encoders 30 and 32. The SSD 20, as illustrated in FIG. 5 as one configuration of another SSD 20B, is allowed not to have the encoder 32. In this case, when the write request signal is input from the host device 10 and the size of data stored in the RRAM 24 exceeds the predetermined size Sref, the SSD 20B is allowed to control the flash memory 22 to store data stored in the RRAM 24 without the decoder 34. When the data read out signal is input from the host device 10, the SSD 20B is allowed to control the flash memory 22 to read out data, input read out data in the decoder 34, and output data from the decoder 34 to the host device 10. An SSD is allowed not to have the encoders 30 and 32 and the decoder. In this case, when the write request signal is input from the host device 10, the SSD is allowed to control the RRAM 24 to store data. When the size of data stored in the RRAM 24 exceeds the predetermined size Sref, the SSD is allowed to control the flash memory 22 to store data stored in the RRAM 24. When the data read out signal is input from the host device 10, the SSD 20 is allowed to control the flash memory 22 to read out data, and output data from the flash memory 22 to the host device 10.

In the SSD 20 of the embodiment, the SSD 20 is set to encode data into BCH code. The code used for error correction is not restricted to BCH coed. The block code such as Reed-Solomon code or the convolutional code such as LDPC code is allowed to be used as code for error correction.

Figure 2:
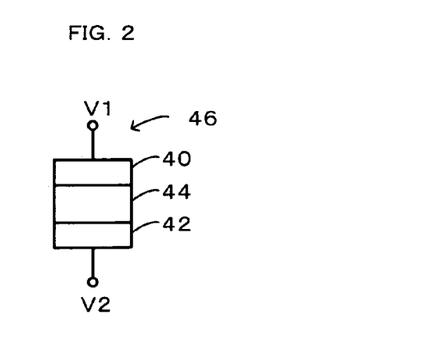
FIG. 2 schematically illustrates one configuration of resistance random access memory 46.

In the SSD 20 of the embodiment, the SSD 20 is set to have the RRAM cell configured as an element performing a bipolar operation. The RRAM cell is allowed to be configured as an element having the resistance memory element 46 and a diode (not illustrated) and performing a unipolar operation. In the unipolar operation, the RRAM cell is set (lowered resistance) when voltage V1 is higher than voltage V2. The RRAM cell is reset (raised resistance) when voltage V1 is higher than the voltage V2 and lower than a voltage setting the RRAM cell to be set. In general, the RRAM cell performing such a unipolar operation is configured to have smaller cell size and simple configuration than the RRAM cell performing such a bipolar operation. Thus smaller area of the RRAM 24 and smaller SSD 20 is accomplished.

In the SSD 20 of the embodiment, the SSD 20 is set to have the RRAM 24. The SSD 20 is allowed to have other nonvolatile random access memory, for example, a ferroelectric random access memory having a capacitor with a ferroelectric material sandwiched by two electrodes, a magnetoresistive random access memory having a MTJ element structured by sandwiching a magnetoresistive film by magnetic films, or a phase change random access memory having an element structured by sandwiching a phase change material by two electrodes.

In the SSD 20 of the embodiment, the SSD 20 is set to transfer data with the host device 10 configured as a personal computer. The host device 10 is not restricted to a device configured as a personal computer. Any device being able to transfer data with the SSD 20, for example, a cellular phone, or a digital still camera, is allowed to be used as the host device 10.

In the SSD 20 of the embodiment, the SSD 20 is set to have the flash memory 22. The SSD 20 is allowed to have other nonvolatile memory storage, for example, hard disk drive etc., instead of the flash memory 22. In the case of hard disk drive, more number of write times does not cause the hard disk to deteriorate. Then the SSD, as illustrated in FIG. 5 as one configuration of another embodiment, is configured not to have the encoder 32. In this case, instead of the RRAM 24, an SSD is allowed to have a nonvolatile memory that is not a random access memory, for example, a flash memory etc.

The primary elements in the embodiment and its modified examples are mapped to the primary constituents in the claims of the invention as described below. In the control device of the present invention, the memory controller 36 is equivalent to the 'data write processing unit'. The memory controller 36 is equivalent to the 'data read out processing unit'. The encoder 30 is equivalent to the 'first encoding circuit'. The decoder 34 is equivalent to the 'decoding circuit'. The encoder 32 is equivalent to the 'second encoding circuit'.

There may be many modifications, changes, and alterations without departing from the scope or spirit of the main characteristics of the present invention. The scope and spirit of the present invention are indicated by the appended claims, rather than by the foregoing description.

The technique of the present invention is preferably applied to the manufacturing industries of control device and data storage device.

The disclose of Japanese Patent Application No. 2010-205965 filed Sep. 14, 2010 including specification, drawings and claims is incorporated herein by reference in its entirety.

What is claimed is:

1. A control device configured to control data transfer between a host device, a first storage configured as a nonvolatile storage for storing data, and a second storage configured as a nonvolatile random access memory having faster write speed than the first storage, the control device comprising:
   a data write processing unit configured to control the second storage to store data input from the host device sequentially when a write request signal requesting to write data stored in the host device to the first storage, and to control the second storage to read out predetermined size of data and control the first storage to store the read out data when the write request signal is input and size of data stored in the second storage reaches the predetermined size; and
   a data readout processing unit configured to control the first storage to read out stored data and to output the read out data to the host device without the second storage when a read out request signal requesting to read out data stored in the first storage to the host device.

2. The control device in accordance with claim 1, further comprising:
   a first encoding circuit configured to encode input data into a predetermined error correcting code and to output the encoded data; and
   a decoding circuit configured to perform error correction and decoding on input data as the predetermined error correcting code and to output decoded data;
   wherein the data write processing unit inputs data input from the host device to the first encoding circuit and controls the second storage to store data output from the first encoding circuit sequentially when the write request signal is input; and
   the data read out processing unit inputs read out data from the first storage in the decoding circuit and outputs data output from the decoding circuit to the host device when the read out request signal is input.

3. The control device in accordance with claim 2, further comprising:
   a second encoding circuit configured to encode input data into the predetermined error correcting code and to output the encoded data;
   wherein the data write processing unit controls the second storage to read out the predetermined size of data, inputs the read out data in the decoding circuit, inputs data output from the decoding circuit in the second encoding circuit, and controls the first storage to store data output from the second encoding circuit when the write request signal is input and size of data stored in the second storage reaches the predetermined size.

4. The control device in accordance with claim 3, wherein:
   the first storage has n semiconductor chips (the n is integer and equal to or larger than 1) and is capable of parallel data read/write to the n semiconductor chips, the semiconductor chip having a nonvolatile memory that differs in type from a nonvolatile memory configuring the second storage;
   the second storage has m semiconductor chips (the m is integer and equal to or larger than 1) and is capable of parallel data read/write to the m semiconductor chips, the semiconductor chip having a nonvolatile random access memory as the nonvolatile memory;
   the first encoding circuit is capable of encoding input data into m predetermined error correcting codes being l (l is integer and equal to or larger than 1) in a code length and outputting the encoded data, the code length being length of data in encoding input data;
   the second encoding circuit encodes input data into n predetermined error correcting codes being k (k satisfies a formula 1, is integer, and is equal to or larger than 1) in the code length and outputting the encoded data;
   the decoding circuit performs error correction and decoding on input data as the n predetermined error correcting codes being the k in the code length and outputs the decoded data when data is input from the first storage, and performs error correction and decoding on input data as the m predetermined error correcting codes being the l in the code length and outputs the decoded data when data is input from the second storage;

the data write processing unit inputs data input from the host device to the first encoding circuit and controls the second storage to store data output from the first encoding circuit in each semiconductor chips of the second storage when the write request signal is input, and controls the second storage to read out data in parallel from each semiconductor chips of the second storage, inputs the read out data in the decoding circuit, inputs data output from the decoding circuit in the second encoding circuit, and controls the second storage to store n data output from the second encoding circuit when the write request signal is input and size of data stored in the second storage reaches the predetermined size;

the data read out processing unit controls the first storage to read out data in parallel from each semiconductor chips of the first storage, inputs read out n data from the first storage in the decoding circuit and outputs data output from the decoding circuit to the host device when the read out request signal is input; and the formula 1 is "m·l=n·k".

5. The control device in accordance with claim 1, wherein the predetermined error correcting code is any one of BCH code, block code and convolutional code.

6. A data storage device configured to store data, the data storage device comprising:

a control device configured to control data transfer between a host device, a first storage configured as a nonvolatile storage for storing data, and a second storage configured as a nonvolatile random access memory having faster write speed than the first storage, the control device having: a data write processing unit configured to control the second storage to store data input from the host device sequentially when a write request signal requesting to write data stored in the host device to the first storage, and to control the second storage to read out predetermined size of data and control the first storage to store the read out data when the write request signal is input and size of data stored in the second storage reaches the predetermined size; and a data read out processing unit configured to control the first storage to read out data stored and to output the read out data to the host device without the second storage when a read out request signal requesting to read out data stored in the first storage to the host device;

a hard disk drive as the first storage; and any one of a resistance random access memory, a ferroelectric random access memory, a magnetoresistive random access memory, a phase change random access memory, or a flash memory as the second storage.

7. A data storage device configured to store data, the data storage device comprising:

a control device configured to control data transfer between a host device, a first storage configured as a nonvolatile storage for storing data, and a second storage configured as a nonvolatile random access memory having faster write speed than the first storage, the control device having: a data write processing unit configured to control the second storage to store data input from the host device sequentially when a write request signal requesting to write data stored in the host device to the first storage, and to control the second storage to read out predetermined size of data and control the first storage to store the read out data when the write request signal is input and size of data stored in the second storage reaches the predetermined size; and a data read out processing unit configured to control the first storage to read out data stored and to output the read out data to the host device without the second storage when a read out request signal requesting to read out data stored in the first storage to the host device;

a flash memory as the first storage; and any one of a resistance random access memory, a ferroelectric random access memory, a magnetoresistive random access memory, a phase change random access memory, as the second storage.

* * * * *